United States Patent
Hsiao et al.

(10) Patent No.: US 10,761,732 B2
(45) Date of Patent: Sep. 1, 2020

(54) MEMORY MANAGEMENT METHOD, MEMORY STORAGE DEVICE AND MEMORY CONTROL CIRCUIT UNIT

(71) Applicant: PHISON ELECTRONICS CORP., Miaoli (TW)

(72) Inventors: Po-Wen Hsiao, Taipei (TW); Hsueh-Chi Lu, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 109 days.

(21) Appl. No.: 15/435,310

(22) Filed: Feb. 17, 2017

(65) Prior Publication Data

US 2018/0165009 A1 Jun. 14, 2018

(30) Foreign Application Priority Data

Dec. 14, 2016 (TW) .............................. 105141375 A

(51) Int. Cl.
*G06F 3/06* (2006.01)
(52) U.S. Cl.
CPC ............ *G06F 3/061* (2013.01); *G06F 3/0655* (2013.01); *G06F 3/0665* (2013.01); *G06F 3/0688* (2013.01)
(58) Field of Classification Search
None
See application file for complete search history.

(56) References Cited

U.S. PATENT DOCUMENTS

| | | | |
|---|---|---|---|
| 9,685,242 B2 * | 6/2017 | Sugiyama | ............... G11C 29/52 |
| 2003/0225961 A1 | 12/2003 | Chow et al. | |
| 2005/0015547 A1 * | 1/2005 | Yokohata | ............... G06F 3/0605 |
| | | | 711/114 |
| 2013/0311705 A1 * | 11/2013 | Cheng | ................. G06F 12/0246 |
| | | | 711/103 |
| 2014/0019670 A1 * | 1/2014 | Huang | ................ G06F 12/0246 |
| | | | 711/103 |

(Continued)

FOREIGN PATENT DOCUMENTS

| | | |
|---|---|---|
| CN | 101645044 | 2/2010 |
| CN | 102650971 | 12/2014 |

(Continued)

OTHER PUBLICATIONS

"Office Action of China Counterpart Application," dated Apr. 1, 2019, p. 1-p. 7.

*Primary Examiner* — Charles Rones
*Assistant Examiner* — Jonah C Krieger
(74) *Attorney, Agent, or Firm* — JCIPRNET

(57) ABSTRACT

A memory management method, a memory storage device and a memory control circuit unit are provided. The method includes: obtaining a usage status of a first physical unit of a rewritable non-volatile memory module for storing data from a host system; determining a first rule according to the usage status; and performing a first operation according to the first rule. The first operation includes: storing a first data from the host system into the first physical unit; and storing a second data from the rewritable non-volatile memory module into a second physical unit, where the first rule corresponds to a first ratio between a data volume of the first data and a data volume of the second data. Accordingly, the memory storage device can store external and internal data stably.

21 Claims, 8 Drawing Sheets

(56) References Cited

U.S. PATENT DOCUMENTS

| | | | | |
|---|---|---|---|---|
| 2015/0242122 A1* | 8/2015 | Yeh | ............... | G06F 3/0611 |
| | | | | 711/103 |
| 2016/0216894 A1* | 7/2016 | Nango | ............... | G06F 3/0604 |
| 2016/0358657 A1* | 12/2016 | Kim | ............... | G11C 16/10 |
| 2018/0189151 A1* | 7/2018 | Zhang | ............... | G06F 11/14 |

FOREIGN PATENT DOCUMENTS

| | | |
|---|---|---|
| CN | 105074673 | 11/2015 |
| CN | 105528301 | 4/2016 |

\* cited by examiner

MEMORY MANAGEMENT METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 105141375, filed on Dec. 14, 2016. The entirety of the above-mentioned patent application is hereby incorporated by reference herein and made a part of this specification.

BACKGROUND

Technical Field

The disclosure relates to a memory management technique, and more particularly, to a memory management method, a memory storage device and a memory control circuit unit.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., a flash memory) ideal to be built in the portable multi-media devices as cited above.

In general, the rewritable non-volatile memory is disposed with physical units for normal usage and spare physical units. When data from a host system is to be stored, the data is stored to the spare physical unit. After data from the host system is stored into a spare physical unit, such spare physical unit becomes a physical unit for normal usage. When data stored in a physical unit for normal usage is deleted by the host system, such physical unit is erased and turned into the spare physical unit.

In order to operate the rewritable non-volatile memory normally, a total amount of the spare physical block is usually maintained greater than a preset number. If the total amount of the spare physical block is less than the preset number, a garbage collection procedure is then performed. In the garbage collection procedure, valid data dispersed in the rewritable non-volatile memory device is collected and stored together back into the rewritable non-volatile memory device, so as to release a new spare physical block.

During the garbage collection procedure, if the host system continues to write data, the rewritable non-volatile memory device may store data from the host system while performing the garbage collection procedure. However, if a data storage strategy is not carefully planned, the data from the host system and the data collected by the garbage collection procedure can fully occupy all the remaining spare physical units as a result.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

In view of the above, the disclosure is directed to a memory management method, a memory storage device and a memory control circuit unit, which are capable of stably storing external and internal data.

An exemplary embodiment of the disclosure provides a memory management method for a rewritable non-volatile memory module having a plurality of physical units. The memory management method includes: obtaining a usage status of a first physical unit among the physical units, wherein the first physical unit is configured to store data from a host system; determining a first rule according to the usage status of the first physical unit; and performing a first operation according to the first rule. The first operation includes: storing a first data from the host system into the first physical unit; and storing a second data from the rewritable non-volatile memory module into a second physical unit among the physical units, where the first rule corresponds to a first ratio, and the first ratio is a ratio between a data volume of the first data and a data volume of the second data.

Another exemplary embodiment of the disclosure provides a memory storage device, which includes a connection interface unit, a rewritable non-volatile memory module and a memory control circuit unit. The connection interface unit is configured to couple to a host system. The rewritable non-volatile memory module includes a plurality of physical units. The memory control circuit unit is coupled to the connection interface unit and the rewritable non-volatile memory module. The memory control circuit unit is configured to obtain a usage status of a first physical unit among the physical units. The first physical unit is configured to store data from the host system. The memory control circuit unit is further configured to determine a first rule according to the usage status of the first physical unit. The memory control circuit unit is further configured to perform a first operation according to the first rule. The first operation includes: storing a first data from the host system into the first physical unit; and storing a second data from the rewritable non-volatile memory module into a second physical unit among the physical units, where the first rule corresponds to a first ratio, and the first ratio is a ratio between a data volume of the first data and a data volume of the second data.

Another exemplary embodiment of the disclosure provides a memory control circuit unit, which is configured to control a rewritable non-volatile memory module having a plurality of physical units. The memory control circuit unit includes a host interface, a memory interface and a memory management circuit. The host interface is configured to couple to a host system. The memory interface is configured to couple to the rewritable non-volatile memory module. The memory management circuit is coupled to the host interface and the memory interface. The memory management circuit is configured to obtain a usage status of a first physical unit among the physical units. The first physical unit is configured to store data from the host system. The memory management circuit is further configured to determine a first rule according to the usage status of the first physical unit. The memory management circuit is further configured to perform a first operation according to the first rule. The first operation includes: storing a first data from the host system into the first physical unit; and storing a second data from the rewritable non-volatile memory module into a second physical unit among the physical units, where the first rule corresponds to a first ratio, and the first ratio is a ratio between a data volume of the first data and a data volume of the second data.

Based on the above, after the usage status of the first physical unit for storing the data from the host system is obtained, the first rule is correspondingly determined and used for performing the first operation. In the first operation, the first data from the host system is stored into the first physical unit and the second data from the rewritable non-volatile memory module is stored into the second physical unit, where the first rule corresponds to the first ratio between the data volume of the first data and the data volume of the second data. By properly determining the first rule, the memory storage device can stably store the data from the host system and the rewritable non-volatile memory module.

To make the above features and advantages of the disclosure more comprehensible, several embodiments accompanied with drawings are described in detail as follows.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
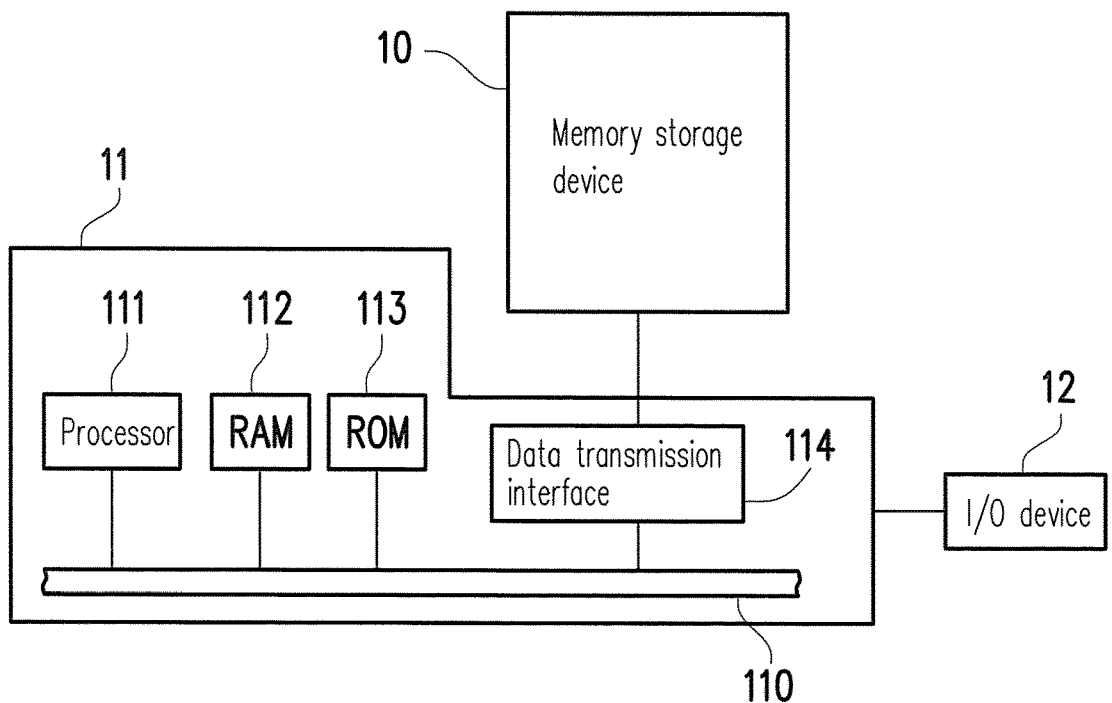
FIG. 1 is a schematic diagram illustrating a host system, a memory storage device and an I/O (input/output) device according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, the memory storage device (also known as a memory storage system) includes a rewritable non-volatile memory module and a controller (also known as a control circuit). The memory storage device is usually configured together with a host system so the host system can write data into the memory storage device or read data from the memory storage device.

Figure 2:
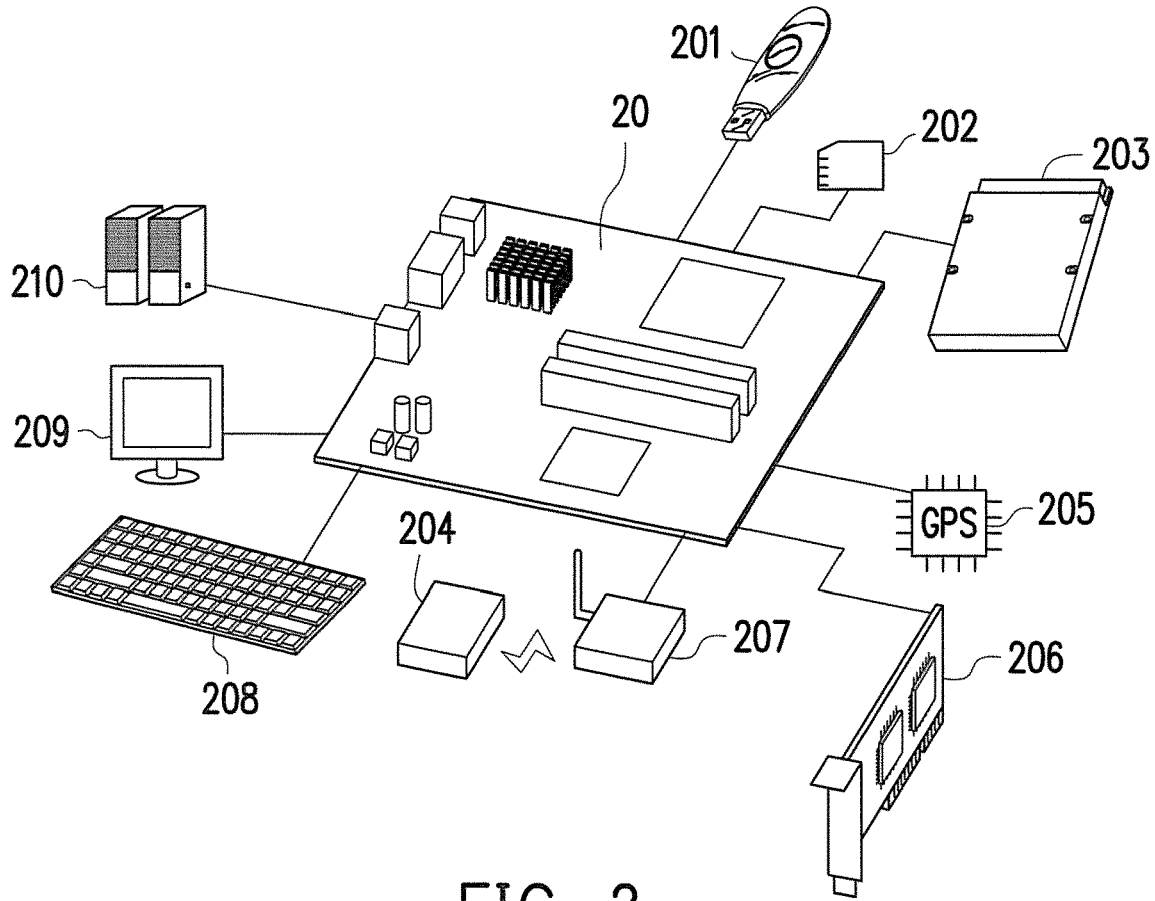
FIG. 2 is a schematic diagram illustrating a host system, a memory storage device and an I/O device according to another exemplary embodiment of the disclosure.

FIG. 1 is a schematic diagram illustrating a host system, a memory storage device and an I/O (input/output) device according to an exemplary embodiment of the disclosure. FIG. 2 is a schematic diagram illustrating a host system, a memory storage device and an I/O device according to another exemplary embodiment of the disclosure.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 can store data into the memory storage device 10 or read data from the memory storage device 10 through the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices, such as a GPS (Global Positioning System) module 205, a network interface card 206, a wireless transmission device 207, a keyboard 208, a monitor 209 and/or a speaker 210 through the system bus 110. For example, in an exemplary embodiment, the main board 20 can access the wireless memory storage device 204 via the wireless transmission device 207.

Figure 3:
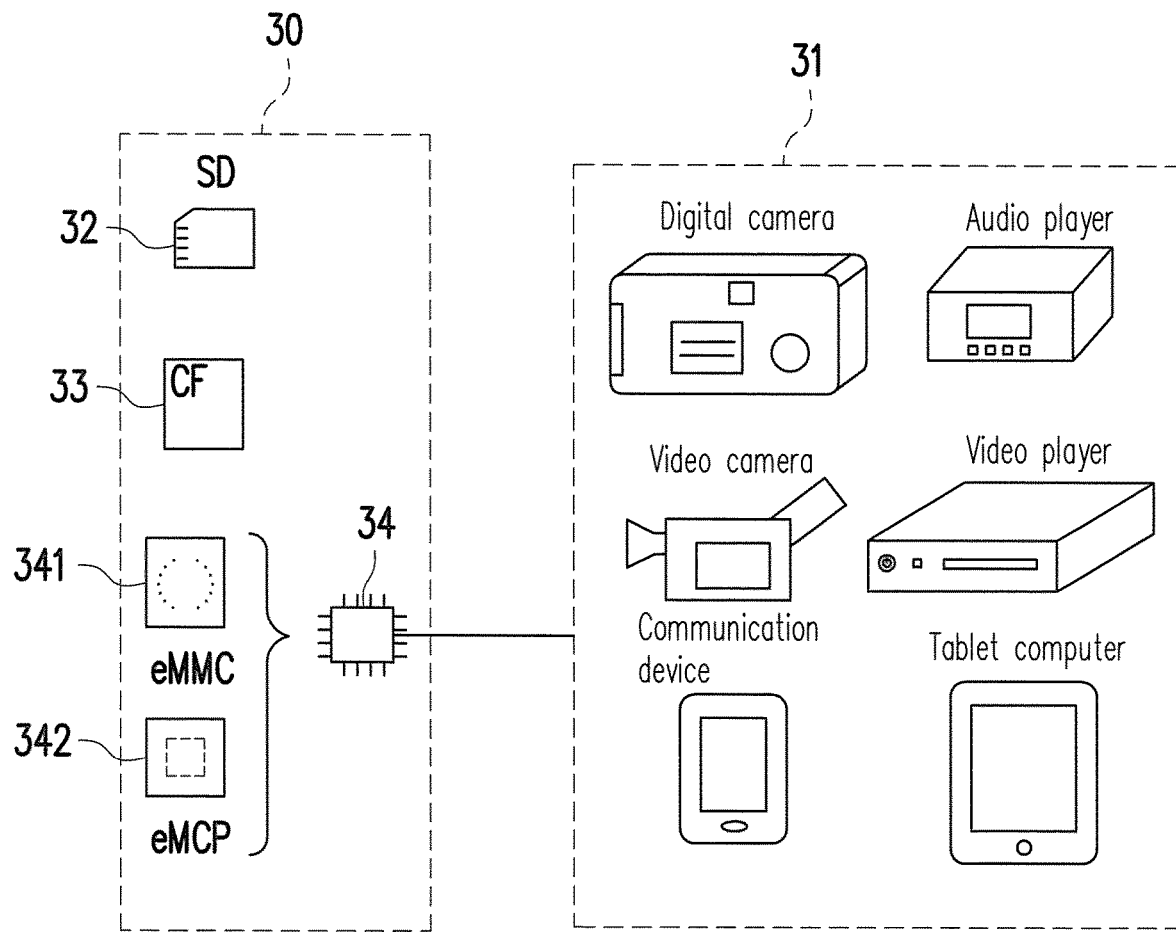
FIG. 3 is a schematic diagram illustrating a host system and a memory storage device according to another exemplary embodiment of the disclosure.

In an exemplary embodiment, aforementioned host system may be any system capable of substantially cooperating with the memory storage device for storing data. Although the host system is illustrated as a computer system in foregoing exemplary embodiment, FIG. 3 is a schematic diagram illustrating a host system and a memory storage device according to another exemplary embodiment of the disclosure. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system 931, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
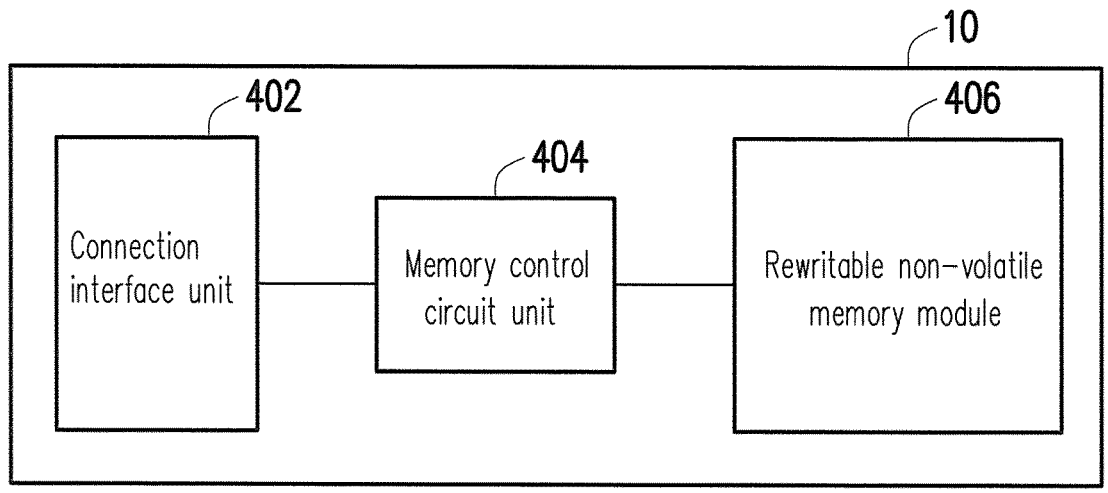
FIG. 4 is a schematic block diagram illustrating a memory storage device according to an exemplary embodiment of the disclosure.

FIG. 4 is a schematic block diagram illustrating a memory storage device according to an exemplary embodiment of the disclosure.

Referring to FIG. 4, the memory storage device 10 includes a connection interface unit 402, a memory control circuit unit 404 and a rewritable non-volatile memory module 406.

The connection interface unit 402 is configured to couple to the memory storage device 10 to the host system 11. In the present exemplary embodiment, the connection interface unit 402 is compatible with a SATA (Serial Advanced Technology Attachment) standard. Nevertheless, it should be understood that the disclosure is not limited thereto. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations, such as writing, reading or erasing data in the rewritable non-volatile memory module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

In the rewritable non-volatile memory module 406, one or more bits are stored in changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". Each of the memory cells in the rewritable non-volatile memory module 406 has a plurality of storage states depended on changes in the threshold voltage. The storage state to which the memory cell belongs may be determined by applying a read voltage to the memory cell, so as to obtain the one or more bits stored in the memory cell.

In the present exemplary embodiment, the memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store more than one bit, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is higher than a writing speed of the upper physical programming unit, and/or a reliability of the lower physical programming unit is higher than a reliability of the upper physical programming unit.

In the present exemplary embodiment, the physical programming unit is the minimum unit for programming. That is, the physical programming unit is the minimum unit for writing data. For example, the physical programming unit is a physical page or a physical sector. When the physical programming unit is the physical page, the physical programming unit usually include a data bit area and a redundancy bit area. The data bit area includes multiple physical sectors configured to store user data, and the redundant bit area is configured to store system data (e.g., management data such as error correcting code, etc.). In the present exemplary embodiment, the data bit area includes 32 physical sectors, and a size of each physical sector is 512 bytes (B). However, in other exemplary embodiments, the data bit area may also include 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
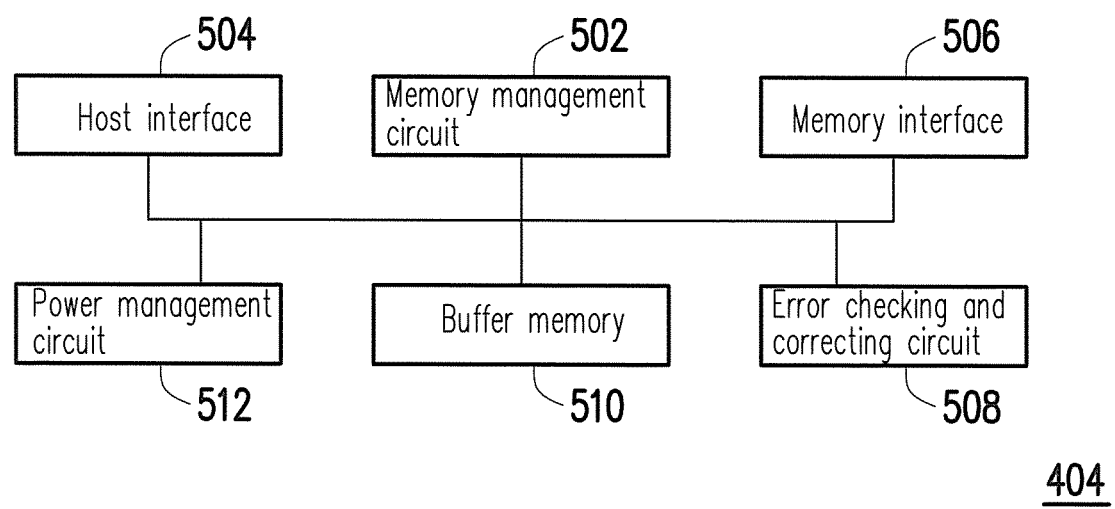
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure.

Referring to FIG. 5, the memory control circuit unit 404 includes a memory management circuit 502, a host interface 504 and a memory interface 506.

The memory management circuit 502 is configured to control overall operation of the memory control circuit unit 404. Specifically, the memory management circuit 502 has a plurality of control commands and the control commands are executed to perform various operations such as writing, reading and erasing data during operation of the memory storage device 10. Hereinafter, operation of the memory management circuit 502 is described as equivalent to describe operation of the memory control circuit unit 404.

In the present exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), the read only memory (not illustrated) and a random access memory (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations, such as writing, reading or erasing data.

Further, in another exemplary embodiment, the control commands of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to give a write command sequence for the rewritable non-volatile memory module 406 in order to write data into the rewritable non-volatile memory module 406. The memory reading circuit is configured to give a read command sequence for the rewritable non-volatile memory module 406 in order to read data from the rewritable non-volatile memory module 406. The memory erasing circuit is configured to give an erase command sequence for the rewritable non-volatile memory module 406 in order to erase data from the rewritable non-volatile memory module 406. The data processing circuit is configured to process both the data to be written into the rewritable non-volatile memory module 406 and the data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequence of other types to the rewritable non-volatile memory module 406 for instructing to perform the corresponding operations.

The host interface 504 is coupled to the memory management circuit 502 and configured to receive and identify commands and data sent from the host system 11. In other words, the commands and data transmitted by the host system 11 are transmitted to the memory management circuit 502 via the host interface 504. In the present exemplary embodiment, the host interface 504 is compatible with the SATA standard. Nevertheless, it should be understood that the disclosure is not limited thereto. The host interface 504 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence which instructs to write data, the read command sequence which instructs to read data, the erase command sequence which instructs to erase data, and other corresponding command sequences for instructing to perform various memory operations (e.g., changing read voltage levels or performing a garbage collection operation). These command sequences are generated by the memory management circuit 502 and transmitted to the rewritable non-volatile memory module 406 through the memory interface 506, for example. The command sequences may include one or more signals, or data transmitted in the bus. The signals or the data may include command codes and program codes. For example, information such as identification codes and memory addresses are included in the read command sequence.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to perform in an error checking and correcting operation to ensure the correctness of data. Specifically, when the memory management circuit 502 receives the write command from the host system 11, the error checking and correcting circuit 508 generates an ECC (error correcting code) and/or an EDC (error detecting code) for data corresponding to the write command, and the memory management circuit 502 writes data corresponding to the write command and the corresponding ECC and/or the EDC into the rewritable non-volatile memory module 406. Then, when the memory management circuit 502 reads the data from the rewritable non-volatile memory module 406, the corresponding ECC and/or the EDC are also read, and the error checking and correcting circuit 508 performs the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

Figure 6:
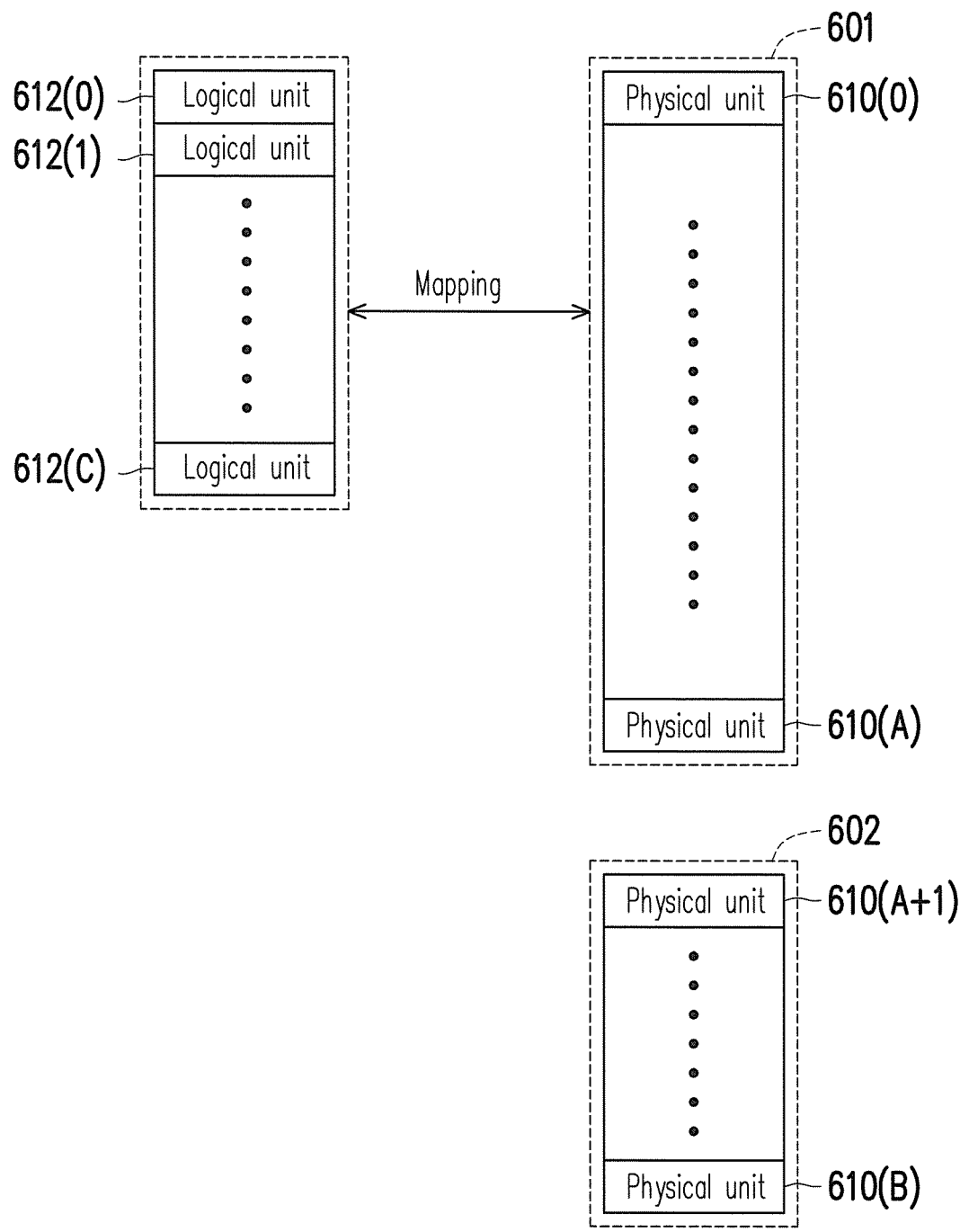
FIG. 6 is a schematic diagram illustrating management of a rewritable non-volatile memory module according to an exemplary embodiment of the disclosure.

FIG. 6 is a schematic diagram illustrating management of a rewritable non-volatile memory module according to an exemplary embodiment of the disclosure. It is noted that terms such as "select" and "group" used for operating the physical units are logical concepts which describe the management for the physical units of the rewritable non-volatile memory module 406 in the following exemplary embodiments. That is to say, the physical units of the rewritable non-volatile memory module 406 are logically operated while actual locations of the physical units of the rewritable non-volatile memory module 406 remain unchanged.

Referring to FIG. 6, the memory management circuit 502 groups physical units 610(0) to 610(B) of the rewritable non-volatile memory module 406 into a storage area 601 and a spare area 602. For example, the physical units 610(0) to 610(A) belong to the storage area 601, and the physical units 610(A+1) to 610(B) belong to the spare area 602. In the present exemplary embodiment, one physical unit refers to one physical erasing unit. However, in another exemplary embodiment, one physical unit may also include a plurality of physical erasing units. In addition, the memory management circuit 502 can associate one specific physical unit with one of the storage area 601 and the spare area 602 by a flag or other means.

During operation of the memory storage device 10, an association relation between one specific physical unit and the storage area 601 or the spare area 602 may be dynamically changed. For example, when receiving write data from the host system 11, the memory management circuit 502 selects one physical unit from the spare area 602 for storing at least a part of the write data and associates the physical unit with the storage area 601. In addition, after one specific physical unit belonging to the storage area 601 is erased so data therein is cleared, the memory management circuit 502 associates the specific physical unit being erased with the spare area 602.

In the present exemplary embodiment, the physical unit belonging to the spare area 602 is also known as a spare physical unit, and the physical unit belonging to the storage area 601 is also known as a non-spare physical unit. Each physical unit belonging to the spare area 602 is the physical unit erased and not stored with any data, and each physical unit belonging to the storage area 601 is stored with data. Furthermore, each physical unit belonging to the spare area 602 is not stored with any valid data, and each physical unit belonging to the storage area 601 may store valid data and/or invalid data.

In the present exemplary embodiment, the memory management circuit 502 can configure logical units 612(0) to 612(C) for mapping to the physical units in the storage area 601. In the present exemplary embodiment, the host system 11 accesses the physical unit of the storage area 601 through a logical address (LA); hence, each logical unit among the logical units 612(0) to 612(C) refers to one logical address. However, in another exemplary embodiment, each logical unit among the logical units 612(0) to 612(C) may also refer to one logical programming unit, one logical erasing unit or a composition of a plurality of consecutive or non-consecutive logical addresses. In addition, each logical unit among the logical units 612(0) to 612(C) may also be mapped to one or more physical units.

In the present exemplary embodiment, the memory management circuit 502 records a mapping relation (also known as a logical-to-physical mapping relation) between the logical units and the physical units into at least one logical-to-physical mapping table. When the host system 11 intends to read the data from the memory storage device 10 or write the data into the memory storage device 10, the memory management circuit 502 may access the data in the memory storage device 10 according to the logical-to-physical mapping table.

It is noted that in the following description, some terms may be replaced with corresponding abbreviations for ease of reading (see Table 1).

TABLE 1

| | |
|---|---|
| logical-to-physical mapping table | L2P table |
| physical-to-logical mapping table | P2L table |
| rewritable non-volatile memory module | RNVM module |
| physical unit | PU |
| physical erasing unit | PEU |
| physical programming unit | PPU |
| logical unit | LU |
| logical erasing unit | LEU |
| logical programming unit | LPU |
| memory management circuit | MMC |
| memory control circuit unit | MCCU |
| error checking and correcting circuit | ECCC |

In the present exemplary embodiment, the valid data is the newest data belonging to one specific LU, and the invalid data is not the newest data belonging to any LU. For example, if the host system 11 stores new data into one specific LU to overwrite old data originally stored in that specific LU (i.e., update the data of that specific LU), this new data stored in the storage area 601 is the newest data belonging to that specific LU and marked as valid, whereas the old data being overwritten may still be stored in the storage area 601 but marked as invalid.

In the present exemplary embodiment, if data belonging to one specific LU is updated, a mapping relation between that specific LU and the PU stored with the old data belonging to that specific LU is removed, and a mapping relation between that specific LU and the PU stored with the newest data belonging to that specific LU is established. Alternatively, in another exemplary embodiment, if data belonging to one specific LU is updated, a mapping relation between that specific LU and the PU stored with the old data belonging to that specific LU may still be maintained depending on practical requirements.

In the present exemplary embodiment, the MMC 502 selects one PU (also known as a first PU), which is configured to store data from the host system 11, from the spare area 602. For example, after the first PU is selected and before this first PU is fully written, the data from the host system 11 is received and stored into this first PU. In an exemplary embodiment, the first PU is also known as an open block. After the current first PU is fully written, another PU is selected from the spare area 602 to serve as the new first PU (or the new open block) for continually storing the data from the host system 11.

On the other hand, the MMC 502 detects whether a total amount of current spare PUs (i.e., the PUs belonging to the spare area 602) and determines whether the total amount is less than a first threshold value. For example, the first threshold value may be 2. If the total amount of the current spare PUs is less than the first threshold value, the MMC 502 activates a data merging operation. In the present exemplary embodiment, the operation of detecting the total amount of the spare PUs and determining whether the total amount is less than the first threshold value is performed in response to one specific PU being selected as the open block. Moreover, in another exemplary embodiment, the operation of detecting the total amount of the spare PUs and determining whether the total amount is less than the first threshold value is continually performed at the background.

In the data merging process, the MMC 502 selects at least one PU (also known as a second PU) from the spare area 602 to serve as a recycling node for the valid data and selects at least one PU (also known as a third PU) from the storage area 601 to serve as a source node for the valid data. The MMC 502 collects the valid data from the third PU serving as the source node and stores the collected valid data into the second PU serving as the recycling node. After all the valid data stored in one specific PU among the third PUs are collected, that specific PU is erased and re-associated with the spare area 602. Accordingly, through the data merging operation, the MMC 502 can release the new spare PU.

After the data merging operation is activated, even though the host system 11 continues to instruct storing data into the memory storage device 10, the number of the PUs being associated to the spare area 602 can gradually become larger than the number of the PUs being associated to the storage area 601 for storing data (e.g., the data received from the host system 11 or the valid data collected from the RNVM module 406). After processing of the data merging operation, if the MMC 502 determines that the total amount of the current spare PEUs is greater than a second threshold value, the MMC 502 stops the data merging operation. Herein, the second threshold value is greater than or equal to the first threshold value. For example, the second threshold value may be 10. In addition, the first threshold value and the second threshold value may also be other values, which are not particularly limited by the disclosure.

In the present exemplary embodiment, the system host 11 sends a write command to instruct storing specific write data (i.e., external data) into the memory storage device 10, where the write data is temporarily stored into the buffer memory 510. Further, when the valid data (i.e., internal data) are collected from the storage area 601 (e.g., the third PU), the valid data is also temporarily stored into the buffer memory 510. Later, the external data from the host system 11 and the internal data from the RNVM module 406 are stored into the RNVM module 406 according a specific rule. For example, the external data is stored into the first PU (i.e., the open block) and the internal data is stored into the second PU (i.e., the recycling node). In addition, the specific rule is configured to define an amount of the internal data to be correspondingly stored into the second PU after an amount of the external data is stored into the first PU, or define an amount of the external data to be correspondingly stored into the first PU after an amount of the internal data is stored into the second PU.

It is noted that, after the data merging operation is activated, if the host system 11 continues to instruct storing the external data into the memory storage device 10, the MMC 502 continues to receive the external data from the host system 11 and continues to receive the internal data from the RNVM module 406. For example, the received external data and internal data are both temporarily stored into the buffer memory 510. The MMC 502 obtains a usage status of the first PU and determines the specific rule according to the usage status of the first PU.

In the present exemplary embodiment, the usage status of the first PU corresponds to a total data volume of data stored in the first PU. For example, the total data volume of the data stored in the first PU may be estimated by a total amount of PPUs currently stored with data in the first PU. For example, if there are ten PPUs currently stored with data in the first PU, the total data volume of the data stored in the first PU can be determined as equal to a total capacity of the ten PPUs. Then, the MMC 502 stores the external data and the internal data both temporarily stored in the buffer memory 510 into the RNVM module 406 according to the determined specific rule.

Figure 7:
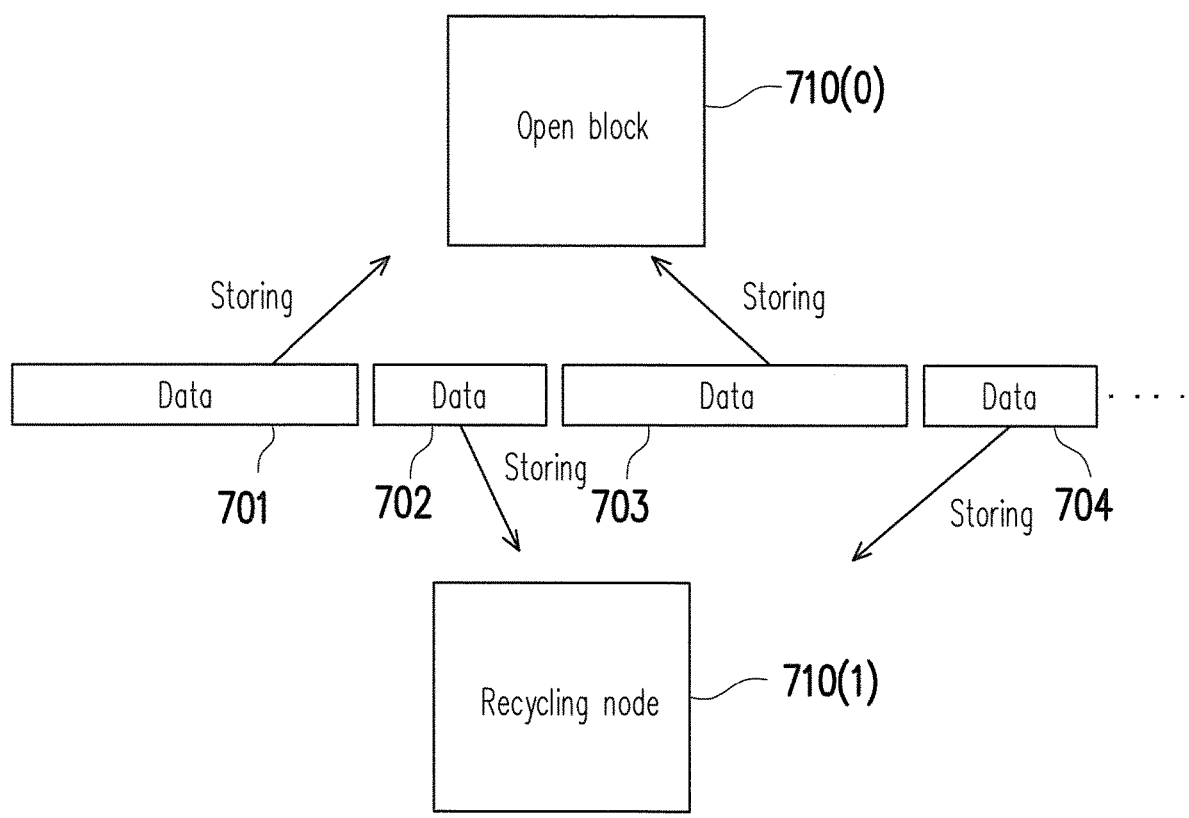
FIG. 7 is a schematic diagram illustrating an operation for storing internal data and external data into the rewritable non-volatile memory module according to an exemplary embodiment of the disclosure.

FIG. 7 is a schematic diagram illustrating an operation for storing internal data and external data into the RNVM module according to an exemplary embodiment of the disclosure.

Referring to FIG. 7, the MMC 502 reads data 701 to 704 from the buffer memory 510, where the data 701 (also known as a first data) and data 703 (also known as a third data) are the data from the host system 11 (i.e., the external data to be stored as instructed by the host system 11), and the data 702 (also known as a second data) and data 704 (also known as a fourth data) are the data from RNVM module 406 (i.e., the internal data collected through the data merging operation). The MMC 502 stores the data 701 to 704 into the RNVM module 406 in sequence. It is noted that, the data 701 and 703 are stored into an open block 710(0) (i.e., the first PU), and the data 702 and 704 are stored into a recycling node 710(1) (i.e., the second PU).

As shown in FIG. 7, the data 701 and the data 702 are successively stored into the RNVM module 406. In the present exemplary embodiment, the operation of storing the data 701 into the open block 710(0) and storing the data 702 into the recycling node 710(1) is also known as a first operation. It is noted that, the first operation is performed based on a specific rule (also known as a first rule), where the first rule corresponds to a ratio (also known as a first ratio) between a data volume of the data 701 and a data volume of the data 702. For example, the first rule can define the ratio between the data volume of the data 701 and the data volume of the data 702 to be "32:1" (i.e., the data volume of the data 701 is 32 times the data volume of the data 702). In another embodiment, the first rule may also correspond to the first ratio being another ratio value rather than limited to the above.

After the data 701 and 702 are stored, the data 703 and 704 are also successively stored into the RNVM module 406. In the present exemplary embodiment, the operation of storing the data 703 into the open block 710(0) and storing the data 704 into the recycling node 710(1) is also known as a second operation. It is noted that, the second operation is performed based on another specific rule (also known as a second rule), where the second rule corresponds to a ratio (also known as a second ratio) between a data volume of the data 703 and a data volume of the data 704. For example, the second rule can define a ratio between the data volume of the data 703 and the data volume of the data 704 to be "16:1", "8:1" or "4:1" (i.e., the data volume of the data 703 is 16, 8 or 4 times the data volume of the data 704). In another exemplary embodiment, the second rule may also correspond to the second ratio being another ratio value as long as it is different from that of the first rule. Furthermore, in another exemplary embodiment, a ratio value of the second ratio is less than a ratio value of the first ratio. For example, if the ratio value of the first ratio is 32, the ratio value of the second ratio may be a value less than 32, such as 16, 8 or 4. Alternatively, if the ratio value of the first ratio is 16, the ratio value of the second ratio may be a value less than 16, such as 8 or 4.

In other words, in an exemplary embodiment of FIG. 7, after the external data containing the data 701 is stored into to the open block 710(0), because the usage status of the open block 710(0) is changed (i.e., the total data volume of the data stored in the first PU is increased), the specific rule for successively storing the external data and the internal data is also changed (i.e., changed from the first rule to the second rule). For example, if each of the data volume of the data 702 and the data volume of the data 704 is one data management unit, the data volume of the data 701 may be 32 data management units and the data volume of the data 703 may be 16 data management units. Among them, one data management unit is, for example, 4 k bytes, 8 k bytes or any size.

Further, in another exemplary embodiment, the operation of storing the data 703 into the open block 710(0) and storing the data 704 into the recycling node 710(1) still belongs to the first operation, which is performed based on the first rule. Therefore, the ratio between the data volume of the data 703 and the data volume of the data 704 may also be equal to the ratio between the data volume of the data 701 and the data volume of the data 702.

In an exemplary embodiment, the MMC 502 determines whether the usage status of the first PU meets a default condition. If the usage status of the first PU meets the default condition, the MMC 502 adjusts the specific rule for storing the external data and the internal data (e.g., the MMC 502 can adjust the specific rule from the first rule to the second rule). Conversely, if the usage status of the first PU does not meet the default condition, the MMC 502 does not adjust the specific rule for storing the external data and the internal data (e.g., the MMC 502 can maintain the specific rule at the first rule). In addition, the MMC 502 can set one or more default conditions, depending on actual requirements. In the process of continually storing the external data into the first PU, if the usage status of the first PU meets one specific default condition, the specific rule is then changed. In an exemplary embodiment, the default condition corresponds to a space usage rate of the first PU. For example, the space usage rate can refer to a rate between the space already stored with data in the first PU and a total space of the first PU.

Figure 8:
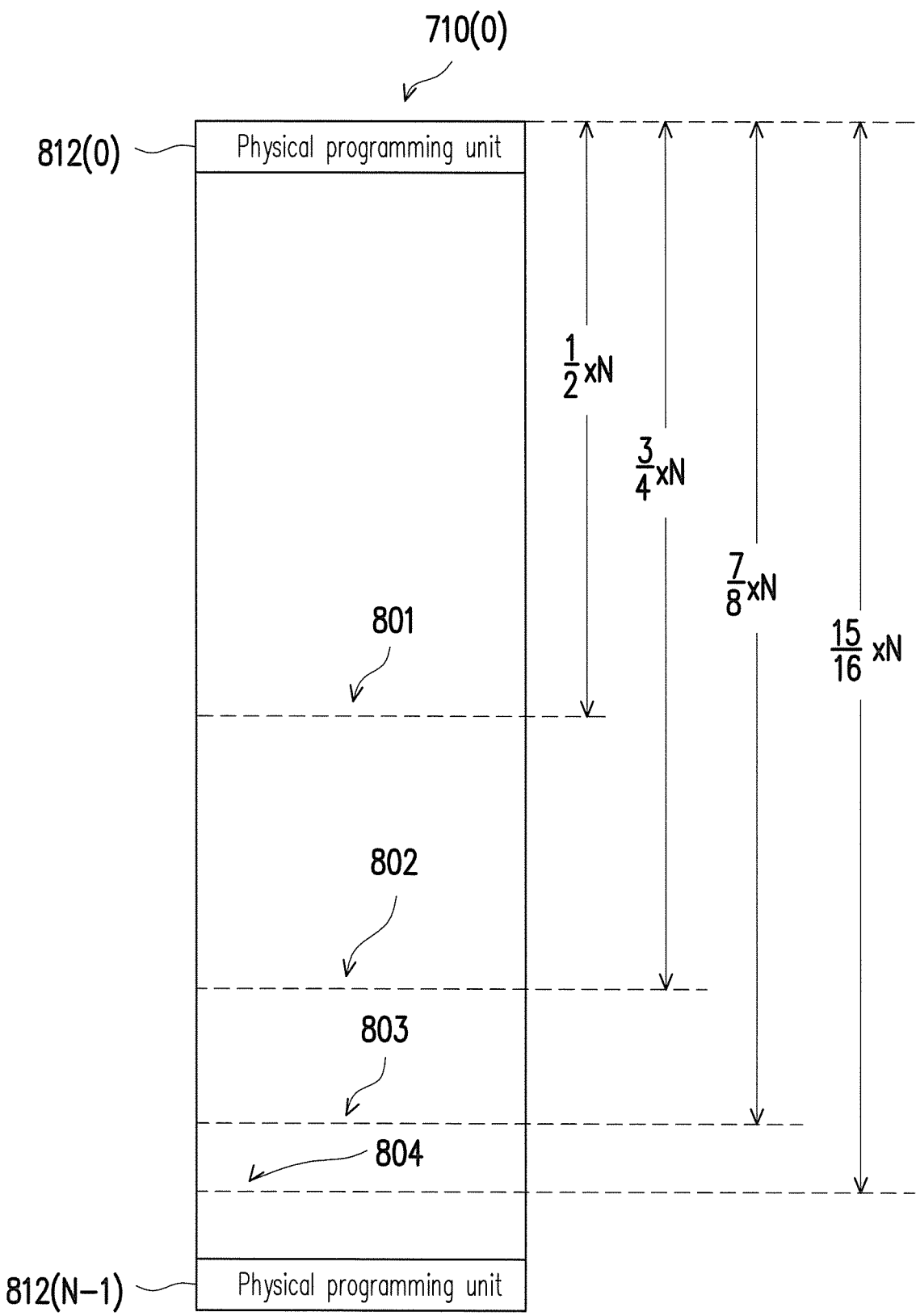
FIG. 8 is a schematic diagram illustrating a usage status of the first physical unit according to an exemplary embodiment of the disclosure.

FIG. 8 is a schematic diagram illustrating a usage status of the first PU according to an exemplary embodiment of the disclosure.

Referring to FIG. 8, it is assumed that the open block 710(0) (i.e., the first PU) includes N PPUs 812(0) to 812(N−1). According to a total amount of the PPUs 812(0) to 812(N−1), the MMC 502 sets four default conditions 801 to 804. For example, the default condition 801 corresponds to the usage status that "½" (one half) the PPUs among the PPUs 812(0) to 812(N−1) are used; the default condition 802 corresponds to the usage status that "¾" the PPUs among the PPUs 812(0) to 812(N−1) are used; the default condition 803 corresponds to the usage status that "⅞" the PPUs among the PPUs 812(0) to 812(N−1) are used; and the default condition 804 corresponds to the usage status that "15/16" the PPUs among the PPUs 812(0) to 812(N−1) are used. In other words, "½", "¾", "⅞" and "15/16" as mentioned above are examples of the space usage rates, and settings for the space usage rates may also be adjusted depending on actual requirements.

In the operation of determining the specific rule according to the usage status of the open block 710(0), if a total amount of PPUs already being used (i.e., already stored with data) among the PPUs 812(0) to 812(N−1) is less than "N×½", the MMC 502 determines that the usage status of the open block 710(0) does not meet any one of the default conditions 801 to 804 and sets the specific rule to a first default rule. After the external data is continually stored into the open block 710(0), if the total amount of PPUs already used among the PPUs 812(0) to 812(N−1) is between "N×½" and "N×¾", the MMC 502 determines that the usage status of the open block 710(0) meets the default condition 801 and sets the specific rule to a second default rule. By analogy, if the total amount of PPUs already used among the PPUs 812(0) to 812(N−1) is between "N×¾" and "N×⅞", the MMC 502 determines that the usage status of the open block 710(0) meets the default condition 802 and sets the specific rule to a third default rule; if the total amount of PPUs already used among the PPUs 812(0) to 812(N−1) is between "N×⅞" and "N×15/16", the MMC 502 determines that the usage status of the open block 710(0) meets the default condition 803 and sets the specific rule to a fourth default rule; moreover, if the total amount of PPUs already used among the PPUs 812(0) to 812(N−1) is greater than "N×15/16", the MMC 502 determines that the usage status of the open block 710(0) meets the default condition 804 and sets the specific rule to a fifth default rule.

It is noted that, in an exemplary embodiment, the first default rule to the fifth default rule correspond to a first default ratio value to a fifth default ratio value, respectively. Among them, the first default ratio value is greater than the second default ratio value, the second default ratio value is greater than the third default ratio value, the third default ratio value is greater than the fourth default ratio value, and the fourth default ratio value is greater than the fifth default ratio value. Taking one exemplary embodiment of FIG. 7 for example, if the first rule is the first default rule, the second rule may be any one of the second default rule to the fifth default rule; if the first rule is the second default rule, the second rule may be any one of the third default rule to the fifth default rule; and the rest may be deduced by analogy.

In other words, in an exemplary embodiment of FIG. 7, with an available capacity remained in the open block 710(0) gradually decreased, in the operation of successively storing the data 701 and the data 702 (or the data 703 and the data 704) into the RNVM module 406, the data volume of the data 701 (or the data 703) is decreased and/or the data volume of the data 702 (or the data 704) is increased. In an exemplary embodiment, by adjusting the specific rule for storing the internal data and the external data according to the usage status of the first PU, a probability of no new spare PU being released after the first PU is fully written can be reduced.

In an exemplary embodiment, the MMC 502 further obtains a valid count of the third PU serving as the source node for the valid data. The valid count corresponds to a total data volume of the valid data stored in the third PU. For example, the valid count may be used to indicate how many PPUs are currently stored with the valid data in the third PU serving as the source node for the valid data. Therefore, according to the valid count, the MMC 502 can obtain the total data volume of the valid data stored in the third PU. According to the valid count, the MMC 502 can determine the specific rule. For example, after obtaining the total data volume of the valid data stored in the third PU, the MMC 502 can calculate how many valid data is to be collected and stored in order to release at least one PU from the third PUs.

According to the calculated total data volume of the valid data that needs to be collected, the MMC 502 can determine the specific rule.

In an exemplary embodiment of FIG. 7, if R second PUs are required for storing the valid data collected from Q third PUs so at least one PU among the Q third PUs can be erased, the MMC 502 can calculate a total capacity of the R second PUs (or a total data of the valid data to be stored to the R second PUs). According to the calculated total capacity of the R second PUs (or the total data volume of the valid data that needs to be collected and stored into the R second PUs) and the available capacity remained in the open block 710(0), the MMC 502 can further determine the ratio between the data volume of the data 701 and the data volume of the data 702 (or the ratio between the data volume of the data 703 and the data volume of the data 704) based on the first rule (or the second rule). It is noted that, the calculated ratio allows that the collected valid data can be (entirely) stored into the R second PUs and at least one PU in the Q third PUs can be erased before the open block 710(0) is fully written.

In general, according to features of the memory storage device 10 itself or user's habits in use of the memory storage device 10, a wear level of certain PUs which are used (e.g., accessed or erased) more often in the RNVM module 406 may be higher than a wear level of other PUs which are used less often. In addition, data stored in the PUs with the higher wear level (e.g., the PUs with the higher P/E counts) is more likely prone to errors. Therefore, in an exemplary embodiment, the MMC 502 further performs a wear leveling operation. This wear leveling operation is configured to move data from at least one PU having a wear level (also known as a first wear level) in the storage area 601 to at least one PU having another wear level (also known as a second wear level) in the spare area 602, where the second wear level is higher than the first wear level.

Figure 9:
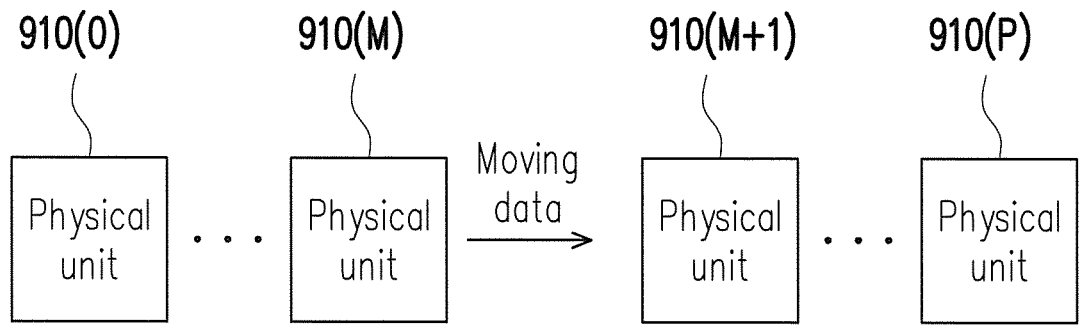
FIG. 9 is a schematic diagram illustrating a wear leveling operation according to an exemplary embodiment of the disclosure.

FIG. 9 is a schematic diagram illustrating a wear leveling operation according to an exemplary embodiment of the disclosure.

Referring to FIG. 9, a wear level of PUs 910(0) to 910(M) is lower than a wear level of PUs 910(M+1) to 910(P). For example, the wear level of each of the PUs 910(0) to 910(M) is lower than the wear level of each of the PUs 910(M+1) to 910(P). Alternatively, the wear level of each of the PUs 910(0) to 910(M) is lower than a default wear level, and/or the wear level of each of the PUs 910(M+1) to 910(P) is higher than the default wear level. In this wear leveling operation, the MMC 502 moves data from PUs 910(0) to 910(M) to the PUs 910(M+1) to 910(P) for storage. Accordingly, the PUs 910(0) to 910(M) with the lower wear level are associated with the spare area 602 for continually receiving the new data from the host system 11, whereas the PUs 910(M+1) to 910(P) with the higher wear level are associated with the storage area 601 to reduce a wearing speed. Through the wear leveling operation, the PUs in the RNVM module 406 may be used more evenly so as to extend an operating life of the memory storage device 10.

In an exemplary embodiment, if the data merging operation is activated, the MMC 502 simultaneously disables the wear leveling operation. Herein, to disable the wear leveling operation refers to disallow performing the wear leveling operation regardless whether it is required. In addition, if the data merging operation is stopped, the MMC 502 simultaneously enables the wear leveling operation. Herein, to enable the wear leveling operation refers to allow performing the wear leveling operation once it is determined as required. For example, the MMC 502 can utilize one flag (e.g., at least one bit) to mark up whether the wear leveling operation is currently disabled or enabled. Accordingly, the storage of the external data and/or the internal data in FIG. 7 may be prevented from being affected by the operation of moving data in the wear leveling operation.

Figure 10:
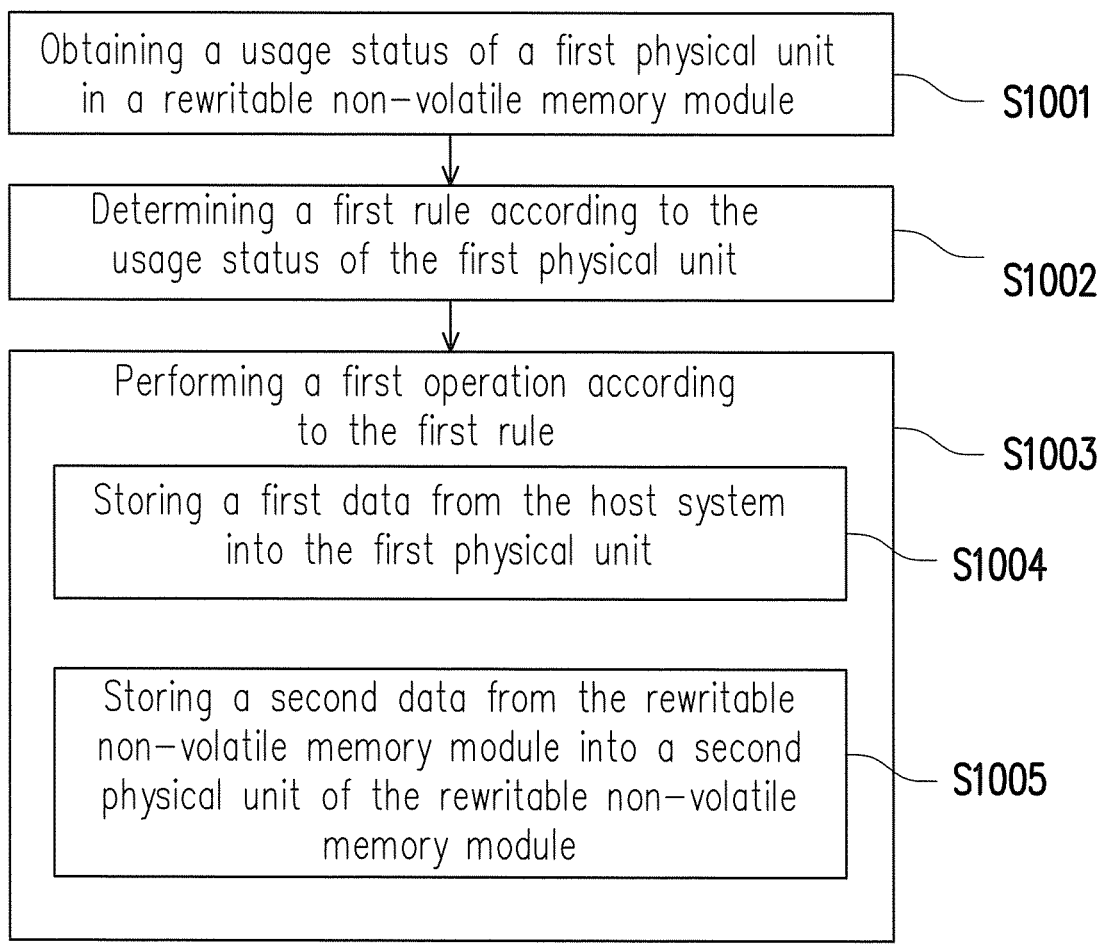
FIG. 10 is a flowchart illustrating a memory management method according to an exemplary embodiment of the disclosure.

FIG. 10 is a flowchart illustrating a memory management method according to an exemplary embodiment of the disclosure.

Referring to FIG. 10, in step S1001, a usage status of a first PU in a RNVM module is obtained, where the first PU is configured to store data from a host system. In step S1002, a first rule is determined according to the usage status of the first PU. In step S1003, a first operation is performed according to the first rule. The first operation includes step S1004 and step S1005. In step S1004, a first data from the host system is stored into the first PU. In step S1005, a second data from the RNVM module is stored into a second PU among PUs, where the first rule corresponds to a first ratio, and the first ratio is a ratio between a data volume of the first data and a data volume of the second data.

Figure 11:
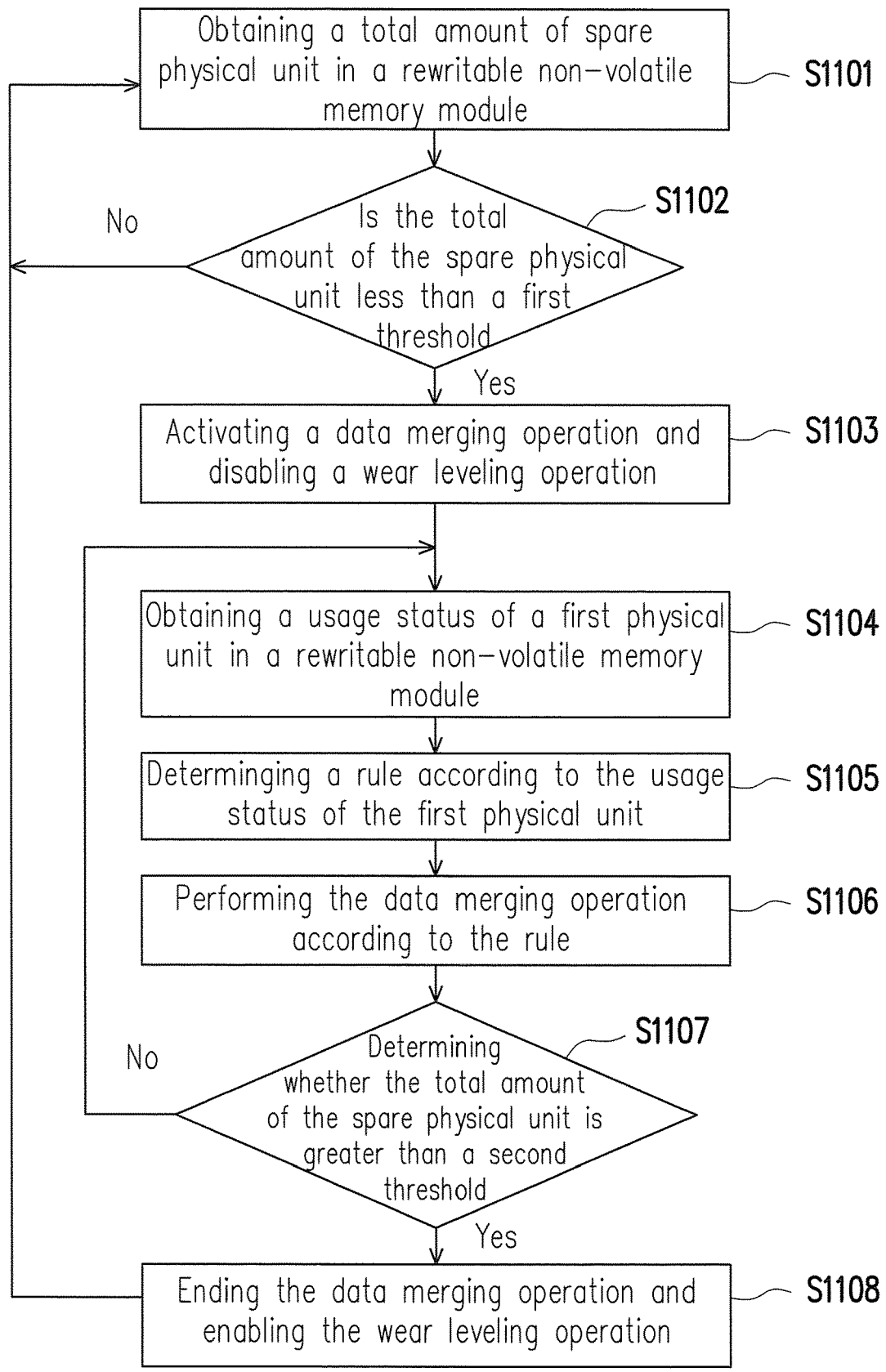
FIG. 11 is a flowchart illustrating a memory management method according to another exemplary embodiment of the disclosure.

FIG. 11 is a flowchart illustrating a memory management method according to another exemplary embodiment of the disclosure.

Referring to FIG. 11, in step S1101, a total amount of spare PU in a RNVM module is obtained. In step S1102, whether the total amount of the spare PU is less than a first threshold value is determined. If the total amount of the spare PU is not less than the first threshold value, the method returns back to step S1101. If the total amount of the spare PU is less than the first threshold value, a data merging operation is activated and a wear leveling operation is disabled in step S1103. In step S1104, a usage status of a first PU in a RNVM module is obtained, where the first PU is configured to store data from a host system. In step S1105, a rule is determined according to the usage status of the first PU. In step S1106, the data merging operation is performed according to the rule. For example, the determined rule can be used to define a ratio between a data volume of internal data and a data volume of external data among data successively stored into the RNVM module during the data merging operation. In step S1107, whether the total amount of the spare PU is greater than a second threshold value is determined. If the total amount of the spare PU is not greater than the second threshold value, steps S1104 to S1106 are repeated. If the total amount of the spare PU is greater than the second threshold value, the data merging operation is ended and the wear leveling operation is enabled. Further, after step S1108, step S1101 can be repeated.

Nevertheless, each of steps depicted in FIG. 10 and FIG. 11 have been described in detail as above, thus related description thereof is not repeated hereinafter. It is noted that, the steps depicted in FIG. 10 and FIG. 11 may be implemented as a plurality of program codes or circuits, which are not particularly limited in the disclosure. Moreover, the methods disclosed in FIG. 10 and FIG. 11 may be implemented with reference to above embodiments, or may be implemented separately, which are not particularly limited in the disclosure.

In summary, the disclosure can determine the first rule according to the usage status of the first PU for storing the data from the host system and perform the first operation according to the first rule. In the first operation, the first data from the host system is stored into the first PU and the second data from the rewritable non-volatile memory module is stored into the second PU, where the first rule corresponds to the first ratio between the data volume of the first data and the data volume of the second data. By properly determining the first rule, the memory storage device can stably store the data from the host system and the rewritable non-volatile memory module. Moreover, the first rule may also be used to ensure that at least one new spare PU can be released by the performed data merging operation while continually storing the data from the host system.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A memory management method for a rewritable non-volatile memory module comprising a plurality of physical units, the memory management method comprising:
   determining whether a space usage rate of a first physical unit among the physical units is a first rate or a second rate, wherein the first physical unit is currently configured to store data from a host system, and the space usage rate reflects a rate between a space already stored with data in the first physical unit and a total space of the first physical unit;
   receiving a first data from the host system and storing the first data to a buffer memory;
   collecting a second data from the rewritable non-volatile memory module by a data merging operation and storing the second data to the buffer memory, wherein the data merging operation is configured to release a first spare physical unit;
   storing at least part of the first data from the buffer memory to the first physical unit during a period that the data merging operation is activated and not terminated;
   storing at least part of the second data to a second physical unit among the physical units during the period that the data merging operation is activated and not terminated;
   controlling, in response to the space usage rate of the first physical unit being the first rate, a ratio between a data volume of the at least part of the first data being stored to the first physical unit and a data volume of the at least part of the second data being stored to the second physical unit to be a first ratio; and
   controlling, in response to the space usage rate of the first physical unit being the second rate, the ratio between the data volume of the at least part of the first data being stored to the first physical unit and the data volume of the at least part of the second data being stored to the second physical unit to be a second ratio, wherein the first ratio is different from the second ratio.

2. The memory management method according to claim 1, wherein the space usage rate of the first physical unit corresponds to a total data volume of data currently stored in the first physical unit.

3. The memory management method according to claim 1, further comprising:
   changing the ratio from the first ratio to the second ratio.

4. The memory management method according to claim 3, wherein the step of changing the ratio from the first ratio to the second ratio comprises:
   changing the ratio from the first ratio to the second ratio if the space usage rate of the first physical unit meets a default condition,
   wherein the default condition corresponds to the space usage rate of the first physical unit.

5. The memory management method according to claim 1, wherein the second data is collected from a third physical unit among the physical units, and the memory management method further comprising:
   erasing the third physical unit.

6. The memory management method according to claim 5, further comprising:
   obtaining a valid count of the third physical unit, wherein the valid count corresponds to a total data volume of data stored in the third physical unit; and
   determining the first ratio according to the valid count.

7. The memory management method according to claim 1, further comprising:
   obtaining a total amount of a second spare physical unit among the physical units; and
   activating the data merging operation and disabling a wear leveling operation if the total amount of the second spare physical unit is less than a threshold,
   wherein the wear leveling operation is configured to move data from at least one physical unit having a first wear level among the physical units to at least one physical unit having a second wear level among the physical units, wherein the second wear level is higher than the first wear level.

8. A memory storage device, comprising:
   a connection interface unit, configured to couple to a host system;
   a rewritable non-volatile memory module, wherein the rewritable non-volatile memory module comprises a plurality of physical units; and
   a memory control circuit unit, coupled to the connection interface unit and the rewritable non-volatile memory module,
   wherein the memory control circuit unit is configured to determine whether a space usage rate of a first physical unit among the physical units is a first rate or a second rate, wherein the first physical unit is currently configured to store data from the host system, and the space usage rate reflects a rate between a space already stored with data in the first physical unit and a total space of the first physical unit,
   the memory control circuit unit is further configured to receive a first data from the host system and store the first data to a buffer memory,
   the memory control circuit unit is further configured to collect a second data from the rewritable non-volatile memory module by a data merging operation and store the second data to the buffer memory, wherein the data merging operation is configured to release a first spare physical unit,
   the memory control circuit unit is further configured to store at least part of the first data from the buffer memory to the first physical unit during a period that the data merging operation is activated and not terminated,
   the memory control circuit unit is further configured to store at least part of the second data to a second physical unit among the physical units during the period that the data merging operation is activated and not terminated,
   the memory control circuit unit is further configured to control, in response to the space usage rate of the first physical unit being the first rate, a ratio between a data volume of the at least part of the first data being stored to the first physical unit and a data volume of the at least part of the second data being stored to the second physical unit to be a first ratio, and the memory control circuit unit is further configured to control, in response to the space usage rate of the first physical unit being the second rate, the ratio between the data volume of the at least part of the first data being stored to the first physical unit and the data volume of the at least part of the second data being stored to the second physical unit to be a second ratio, wherein the first ratio is different from the second ratio.

9. The memory storage device according to claim 8, wherein the space usage rate of the first physical unit corresponds to a total data volume of data currently stored in the first physical unit.

10. The memory storage device according to claim 8, wherein the memory control circuit unit is further configured to change the ratio from the first ratio to the second ratio.

11. The memory storage device according to claim 10, wherein the operation of changing the ratio from the first ratio to the second ratio comprises:
changing the ratio from the first ratio to the second ratio if the space usage rate of the first physical unit meets a default condition,
wherein the default condition corresponds to the space usage rate of the first physical unit.

12. The memory storage device according to claim 8, wherein the second data is collected from a third physical unit among the physical units,
wherein the memory control circuit unit is further configured to erase the third physical unit.

13. The memory storage device according to claim 12, wherein the memory control circuit unit is further configured to obtain a valid count, wherein the valid count corresponds to a total data volume of data stored in the third physical unit,
wherein the memory control circuit unit is further configured to determine the first ratio according to the valid count.

14. The memory storage device according to claim 8, wherein the memory control circuit unit is further configured to obtain a total amount of a second spare physical unit among the physical units,
wherein the memory control circuit unit is further configured to activate the data merging operation and disable a wear leveling operation if the total amount of the second spare physical unit is less than a threshold,
wherein the wear leveling operation is configured to move data from at least one physical unit having a first wear level among the physical units to at least one physical unit having a second wear level among the physical units, wherein the second wear level is higher than the first wear level.

15. A memory control circuit unit for controlling a rewritable non-volatile memory module comprising a plurality of physical units, the memory control circuit unit comprising:
a host interface, configured to couple to a host system;
a memory interface, configured to couple to the rewritable non-volatile memory module;
a buffer memory; and
a memory management circuit, coupled to the host interface, the buffer memory and the memory interface,
wherein the memory management circuit is configured to determine whether a space usage rate of a first physical unit among the physical units is a first rate or a second rate, wherein the first physical unit is currently configured to store data from the host system, and the space usage rate reflects a rate between a space already stored with data in the first physical unit and a total space of the first physical unit, the memory management circuit is further configured to receive a first data from the host system and store the first data to the buffer memory, the memory management circuit is further configured to collect a second data from the rewritable non-volatile memory module by a data merging operation and store the second data to the buffer memory, wherein the data merging operation is configured to release a first spare physical unit, the memory management circuit is further configured to store at least part of the first data from the buffer memory to the first physical unit during a period that the data merging operation is activated and not terminated, the memory management circuit is further configured to store at least part of the second data to a second physical unit among the physical units during the period that the data merging operation is activated and not terminated, the memory management circuit is further configured to control, in response to the space usage rate of the first physical unit being the first rate, a ratio between a data volume of the at least part of the first data being stored to the first physical unit and a data volume of the at least part of the second data being stored to the second physical unit to be a first ratio, and the memory management circuit is further configured to control, in response to the space usage rate of the first physical unit being the second rate, the ratio between the data volume of the at least part of the first data being stored to the first physical unit and the data volume of the at least part of the second data being stored to the second physical unit to be a second ratio, wherein the first ratio is different from the second ratio.

16. The memory control circuit unit according to claim 15, wherein the space usage rate of the first physical unit corresponds to a total data volume of data currently stored in the first physical unit.

17. The memory control circuit unit according to claim 15, wherein the memory management circuit is further configured to change the ratio from the first ratio to the second ratio.

18. The memory control circuit unit according to claim 17, wherein the operation of changing the ratio from the first ratio to the second ratio comprises:
changing the ratio from the first ratio to the second ratio if the space usage rate of the first physical unit meets a default condition,
wherein the default condition corresponds to the space usage rate of the first physical unit.

19. The memory control circuit unit according to claim 15, wherein the second data is collected from a third physical unit among the physical units,
wherein the memory management circuit is further configured to erase the third physical unit.

20. The memory control circuit unit according to claim 19, wherein the memory management circuit is further configured to obtain a valid count, wherein the valid count corresponds to a total data volume of data stored in the third physical unit, wherein the memory management circuit is further configured to determine the first ratio according to the valid count.

21. The memory control circuit unit according to claim 15, wherein the memory management circuit is further configured to obtain a total amount of a second spare physical unit among the physical units,
wherein the memory management circuit is further configured to activate the data merging operation and disable a wear leveling operation if the total amount of the second spare physical unit is less than a threshold,
wherein the wear leveling operation is configured to move data from at least one physical unit having a first wear level among the physical units to at least one physical unit having a second wear level among the physical units, wherein the second wear level is higher than the first wear level.

* * * * *